Patented June 27, 1944

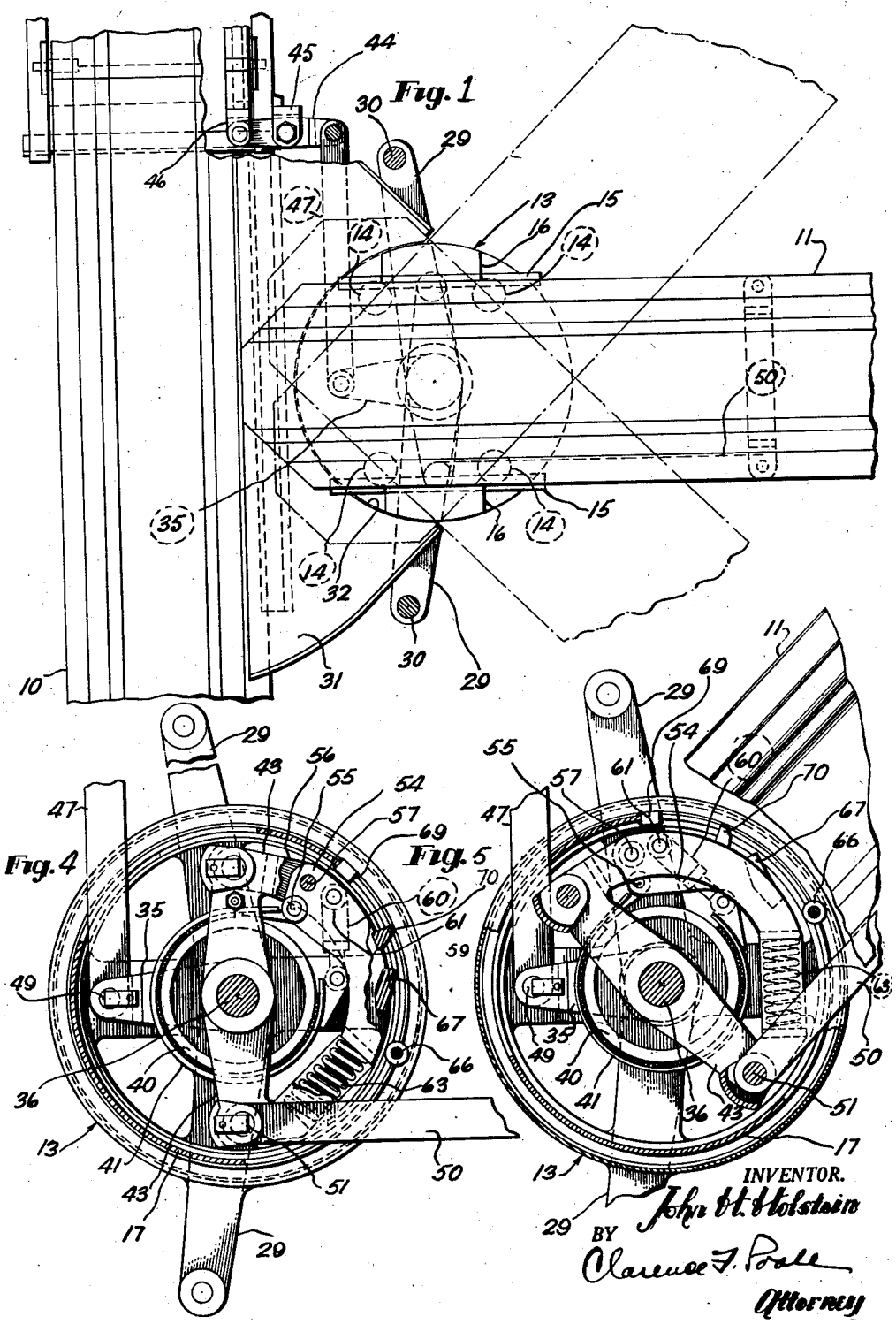

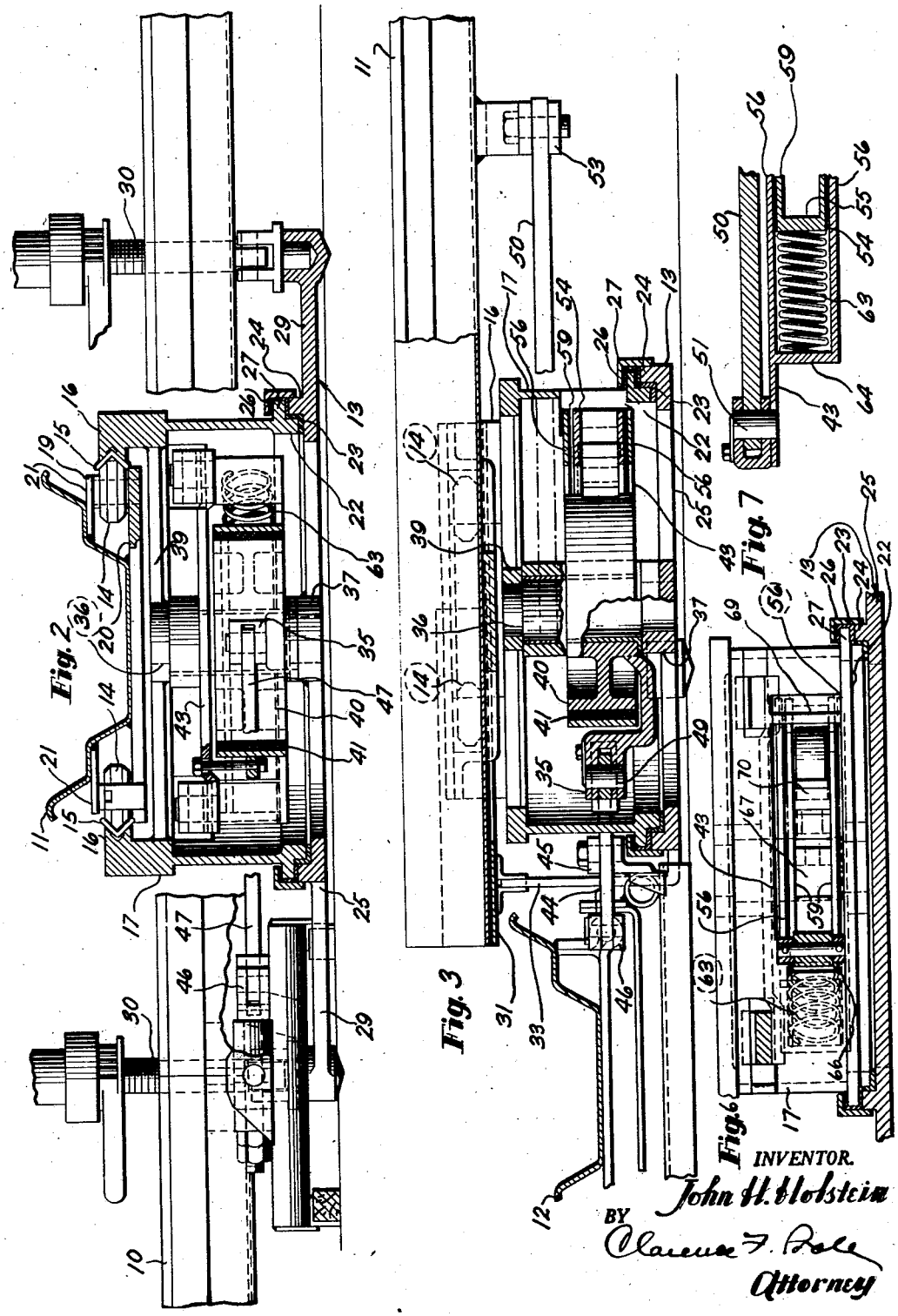

2,352,262

UNITED STATES PATENT OFFICE 2,352,262

ANGLE DRIVE

John H. Holstein, Chicago, Ill., assignor to Goodman Manufacturing Company, Chicago, Ill., a corporation of Illinois Application November 23, 1942, Serial No. 466,573

13 Claims. (Cl. 198—220)

This invention relates to improvements in angle drives for shaker conveyor trough lines and more particularly relates to an improved angle drive automatically adjustable to drive one trough section of a conveyer from another when the trough sections are in various positions of horizontal angular adjustment with respect to each other.

Heretofore, angle drives of the bell crank type have been used for driving a branch shaker conveyer trough line, at an angle to a main conveyer trough line, from a main shaker conveyer trough line. Such angle drives are satisfactory when the angle between the branch and main trough lines is fixed, but difficulties are encountered when the angular position of the branch and main trough lines is frequently changed. One reason is that the arms of the bell crank are fixed for one angular position of the troughs and the efficiency of the conveying action of the driven trough section is impaired when the troughs are at an angle other than that for which the bell crank was designed, due to the fact that the bell crank will tend to drive the driven trough in a transverse as well as a longitudinal direction. This will impart a thrusting action to one side of the driven trough line which will cause the material conveyed to pile up and move along one side of the driven trough line and will also impart an uneven thrust to the guide means for the driven trough line, where a guide means is provided.

The principal objects of my present invention are to overcome these difficulties by providing an angle drive including a bell crank, the lever arms of which are automatically adjustable with respect to each other upon horizontal angular adjustment of the driven trough section of the conveyer, so that a substantially straight line driving action will always be imparted thereto.

Other objects of my invention will appear from time to time as the following specification proceeds and with reference to the accompanying drawings wherein:

Figure 1 is a fragmentary plan view of a shaker conveyer trough line, showing a trough section of a branch shaker conveyer trough line disposed at right angles to the main trough line, and generally illustrating my improved form of angle drive;

Figure 2 is an end view of the device shown in Figure 1, with certain parts of the troughs broken away and certain parts of the angle drive shown in vertical section;

Figure 3 is a view in side elevation of the device shown in Figure 1, with certain parts of the driven trough broken away, and showing the angle drive in substantially longitudinal section;

Figure 4 is a plan view of the angle drive with certain parts broken away and certain other parts shown in horizontal section in order to illustrate certain details of construction thereof, and showing the lever arms of the bell crank at the central part of their strokes;

Figure 5 is a plan view somewhat similar to Figure 4, but with the driven trough section of the conveyer in a different position than in Figure 4, and with certain other parts broken away and shown in section than in Figure 4, but showing the lever arms of the bell crank at the central part of their stroke;

Figure 6 is a detail view in side elevation of the angle drive, with certain parts broken away and certain other parts shown in section; and Figure 7 is an enlarged detail fragmentary vertical sectional view showing certain details of the mounting for the spring, which serves to hold the driven lever arm of the bell crank in fixed relation with respect to the driving arm of said bell crank.

Referring now in particular to the drawings, a trough section 10 of a main conveyer trough line is partially shown in Figure 1, and a delivery end of a trough section 11 of a branch conveyer trough line is shown as being arranged to deliver material into said trough section 10. Said trough section 10 may be driven from a usual type of shaker conveyer drive mechanism in a manner well known to those skilled in the art, so as to cause the movement of material therealong from one end of the trough line to the other, due to reciprocable movement of said trough section.

The branch trough section 11 is mounted at its receiving end on an angle drive 13, for reciprocable movement with respect thereto and for turning movement with respect to the driving trough section 10 about a vertical axis, spaced to one side of said driving trough section. The receiving end of said trough section 11 is reciprocably mounted on said angle drive on two pairs of spaced rollers 14, 14, one pair of said rollers being on each side of said trough section. Said rollers are rotatable about vertical axes and each has a substantially V-shaped rim or face. Said faces are adapted to engage and be supported by facing angular guide tracks 15, 15. Said guide tracks are mounted on and extend along upright supports 16, 16, which extend upwardly from opposite sides of a turning frame 17. As herein shown, said rollers are mounted on vertical shafts 19, 19, mounted at their lower ends in a supporting plate 20, secured to and extending across the bottom of said trough section 11, and mounted at their upper ends in brackets 21, 21, secured to opposite sides of said trough section, intermediate the ends thereof, and projecting laterally therefrom in opposite directions (see Figure 2).

The turning frame 17 is of a drum-shaped formation and has a lower portion 22, which is mounted on a shouldered annular bearing 23, mounted on an annular upright flanged portion 24 of a base 25, for said angle turn. A flanged retaining ring 26 is mounted on said upright flanged portion of said base and extends over a flanged portion 27 of said turning frame, to hold said turning frame from vertical movement with respect to said base.

The base 25 is provided with a pair of laterally projecting arms 29, 29 adapted to rest on the ground at their ends and be held in position by means of suitable jacks 30, 30 interposed between the ends of said arms and the mine roof. Said jacks may be of an ordinary screw type of construction and are not herein shown or described in detail since they form no part of my present invention.

When the base 25 is held stationary on the ground, turning movement of the discharge trough section 11 will cause turning movement of the turning frame 17 with respect to the base 25, due to engagement of the pairs of spaced rollers 14, 14 with the guide tracks 15, 15.

A discharge apron 31 is mounted beneath the discharge end of the trough section 11. Said apron extends along and over the edge of the trough section 10 and is adapted to deflect material onto said trough section, when said discharge trough section is at various positions of horizontal adjustment with respect to said receiving trough section. As herein shown, said apron is provided with an arcuate open portion 32, to receive the discharge end of said trough section 11 and to permit pivotal adjustment of said trough section with respect to said apron, and is mounted on the base 25 by means of spaced apart vertically extending support arms 33, 33 (see Figure 3).

Referring now in particular to the details of the angle turn 13 and the releasable bell crank drive from the trough section 10 to the trough section 11, said bell crank drive includes a rocking member 35 journaled on a vertical shaft 36. Said shaft is mounted at its lower end in a central boss 37 of the base 25 and at its upper end in a support member 39, extending across an open central portion of the turning frame 17. A brake drum 40 is herein shown as being formed integral with said rocking member and is adapted to be engaged by a friction band 41, mounted on and connected with a rocking member 43, for rocking said rocking member upon rocking movement of said rocking member 35.

The connection from the trough section 10 to the rocking member 35, for rocking said rocking member upon reciprocable movement of said trough section, includes an arm 44, projecting laterally from the trough section 10 in the direction of the trough section 11. Said arm is mounted intermediate its ends on a support bracket 45, secured to and projecting laterally from said trough section 10. The inner end of said arm is pivotally connected between the furcations of a bifurcated head of a connecting bolt 46, which connecting bolt serves to hold adjacent ends of the trough sections 10, 10 of the trough line together. The outer end of said arm has a drive link 47 pivotally connected thereto, which extends longitudinally of said trough section 10 and is pivotally connected to the end of the rocking arm 35, by means of a pivotal pin 49.

The rocking member 43 has a link 50 pivotally connected thereto by means of a pivotal pin 51. Said link extends along said trough section 11 and is pivotally connected at its free end to a bracket 53, depending from and secured to the bottom of said trough section 11, for reciprocably driving said trough section upon rocking movement of said rocking member 43.

The friction band 41, which forms the releasable drive means between the rocking members 35 and 43 of the bell crank, is connected with a pivoted engaging member 54, by means of a pivotal pin 55. Said engaging member serves to engage or disengage said friction band with the drum 40 and is mounted between vertically spaced upper and lower sides 56, 56 of the rocking member 43, and is pivotally connected thereto by means of a vertical pin 57. Said engaging member is herein shown as being of a hollow box-like construction and has a pair of vertically spaced upper and lower sides 59, 59 between which extends a link 60, which is pivotally connected thereto by means of a pivotal pin 61. The end of said link opposite from said pivotal pin is pivotally connected with the free end of the friction band 41. Said link may be shortened or lengthened to adjust the tension of said friction band on said brake drum.

A compression spring 63 is seated between the spaced upper and lower sides 56, 56 of the rocking member 43 and abuts an end wall 64 of said rocking member at one of its ends and an end 65 of the engaging member 54 at its opposite end, to urge said engaging member in a direction to engage the friction band 41 with the drum 40.

The means for releasing the friction band 41 from the drum 40 includes a stop in the form of a roller 66 mounted on the drum portion of the turning frame 17. Said roller is adapted to engage a stop 67 on the engaging member 54 to release the friction band 41. Said stop is mounted between the upper and lower sides 59, 59 of said pivoted member, and is herein shown as being formed integral therewith. The distance between the engaging surface of the roller 66 and the stop 67 is equal to half the stroke of the conveyer, when the rocking member 43 is centered with respect to the driven trough section 11, and is at the center of its stroke. When said rocking member 43 is off center with respect to the trough 11, said stop will engage said roller during alternate strokes of the conveyer, to depress said pivoted engaging member against the spring 63, and move the link 60 in a direction to release the friction band 41 from the drum 40. During the opposite strokes of the conveyer said friction band will be engaged with said drum. It should here be understood that the time said friction band is disengaged from said drum is only equal to a portion of the stroke of the conveyer, except when the roller 66 is in an extreme position, and that the length of time said roller is engaged with said drum decreases as the rocking member 43 reaches a centered position with respect to the trough 11. This engaging and disengaging action of said friction band will thus occur until the distance between the engaging faces of the stops 66 and 67 is equal to one-half the stroke of the conveyer, when the rocking member 43 is at the center of its stroke, as may be seen with reference to Figures 5 and 6.

An engaging member or stop 69 is provided on the drum portion of the turning frame 17 and is spaced from the engaging member 66 on the opposite side of the stop 67 from the roller 66. Said engaging member is adapted to be engaged by a stop 70 on the pivoted member 54 when the trough section 11 is moved in an opposite direction from that just described, and the rocking member 43 is off center with respect to the trough section 11.

When the trough section 11 is turned to the left, as in Figure 5, and the rocking member 35 is being reciprocably driven by the trough section 10, the stop 70 will engage the stop 69 during each stroke of the conveyer, to release the friction band 41 during a part of each stroke of the conveyer. The amount of release of said friction band depends upon the distance the trough section 11 is off center with respect to the rocking member 43, as has been mentioned before, said friction band being engaged with the drum 40 during the remainder of the stroke of the conveyer by the spring 63. This releasing and engaging action will occur until the engaging member 69 no longer engages the stop 70, at which time the stops 69 and 67 will be centered with respect to the stops 70 and 66. The link 50 will then drive the trough section in a line substantially parallel to the center line of said trough line.

When the trough section 11 is turned in an opposite direction and the conveyer is in operation, the stop 67 will engage the stop 66 during each stroke of the conveyer, to alternately engage and release the friction band 41 with respect to the drum 40, until the distance between the engaging faces of the stops 66 and 67 is the same as the distance between the engaging faces of the stops 70 and 69, at which time the rocking member 43 will be centered with respect to the trough 11.

It may be seen from the foregoing that a novel form of bell crank drive has been provided for driving one trough section of a shaker conveyer from another, one of which is horizontally adjustable with respect to the other, and that the arms of the bell crank are relatively movable with respect to each other so the driving action of the driven bell crank will always be the same regardless of the angular position of the driving trough section with respect to the driven trough section. It may also be seen that the arms of the bell crank are moved to their proper driving positions by the reciprocable action of the conveyer and that the bell crank associated with the horizontally adjustable trough is self-centering, so a substantially straight line driving action will always be imparted to the adjustable trough section of the conveyer.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer angle drive, a pair of conveyer troughs, one of which is arranged at an angle with respect to the other and which is horizontally adjustable with respect to the other, and means for driving one trough from the other in substantially the direction of the longitudinal axis of the driven trough in all positions of longitudinal adjustment of said troughs with respect to each other including a bell crank, one arm of which is movable with respect to the other upon adjustable movement of one trough with respect to the other, to maintain the arms of said bell crank in the same angular relation with respect to their associated troughs in all positions of horizontal adjustment of said troughs with respect to each other.

2. In a shaker conveyer angle drive, a pair of conveyer troughs, one of which is arranged at an angle with respect to the other and which is horizontally adjustable with respect to the other, and means for driving one trough from the other in substantially the direction of the longitudinal axis of the driven trough in all positions of longitudinal adjustment of said troughs with respect to each other including a bell crank, one arm of which is movable with respect to the other upon adjustable movement of one trough with respect to the other, to maintain the arms of said bell crank in the same angular relation with respect to their associated troughs in all positions of horizontal adjustment of said troughs with respect to each other, and friction means for holding said arms of said bell crank in fixed relation with respect to each other, to drive one trough from the other.

3. In a shaker conveyer angle drive, a pair of conveyer troughs, one of which is arranged at an angle with respect to the other and which is horizontally adjustable with respect to the other, and means for driving one trough from the other including a bell crank, one arm of which is movable with respect to the other upon adjustable movement of one trough with respect to the other to maintain the arms of said bell crank in the same angular relation with respect to their associated troughs in all positions of horizontal adjustment of said troughs with respect to each other, friction means for holding said arms of said bell crank in fixed relation with respect to each other, and means adjustably movable with said adjustable trough for releasing said friction means, to permit relative movement of one of said arms with respect to the other.

4. In a shaker conveyer angle drive, a pair of conveyer troughs, one of which is arranged at an angle with respect to the other and which is horizontally adjustable with respect to the other, and means for driving one trough from the other including a bell crank, one arm of which is movable with respect to the other upon adjustable movement of one trough with respect to the other, to maintain the arms of said bell crank in the same angular relation with respect to their associated troughs in all positions of horizontal adjustment of said troughs with respect to each other, friction means for holding said arms of said bell cranks in fixed relation with respect to each other, releasing means associated with said friction means for releasing said friction means, and a pair of spaced apart stops movable with said adjustable trough upon adjustable movement thereof and adapted to engage said releasing means during alternate strokes of the conveyer, to cause momentary release of said friction means, said stops each being spaced from said releasing means a distance equal to half the stroke of the conveyer when said arms of said bell crank are at the intermediate parts of their strokes, to momentarily release said friction means during alternate strokes of the conveyer until said releasing means has centered itself between said stops.

5. In a shaker conveyer angle drive, a driving trough, a driven trough arranged in cascade relation with respect to said driving trough and being horizontally adjustable with respect thereto, a rocking member, a drive connection from said driving trough to said rocking member, a second rocking member rockable about an axis coaxial with the axis of rocking movement of said first rocking member, a drive connection from said second rocking member to said driven trough, and means for driving one rocking member from the other, said means being releasable to permit relative movement of one rocking member with respect to the other upon adjustable movement of one trough with respect to the other, to maintain the rocking member associated with the driven trough in the same angular relation with respect thereto, in all positions of adjustment thereof and being automatically operative to center said second rocking member with respect to said driven trough.

6. In a shaker conveyer angle drive, a driving trough, a driven trough arranged in cascade relation with respect to said driving trough and being horizontally adjustable with respect thereto, a rocking member, a drive connection from said driving trough to said rocking member, a second rocking member rockable about an axis coaxial with the axis of rocking movement of said first rocking member, a drive connection from said second rocking member to said driven trough, and a friction drive connection from one rocking member to the other, said drive connection being releasable upon horizontal movement of said horizontally adjustable trough, to permit relative movement of one rocking member with respect to the other upon adjustable movement of said adjustable trough, to maintain said second rocking member in the same angular relation with respect to said adjustable trough in all positions of adjustment thereof.

7. In a shaker conveyer angle drive, a driving trough, a driven trough arranged in cascade relation with respect to said driving trough and being horizontally adjustable with respect thereto, a rocking member, a connection from one trough to said rocking member, for rocking said rocking member, a second rocking member rockable about an axis coaxial with the axis of rocking movement of said first rocking member, a drive connection from said second rocking member to said driven trough, and a friction drive connection from one rocking member to the other, said drive connection being releasable upon horizontal movement of said horizontally adjustable trough, to permit said rocking member associated with said adjustable trough to move to a position to maintain said rocking member in the same angular relation with respect to said adjustable trough in all positions of adjustment thereof, and including a friction band associated with one of said rocking members and having releasable engaging connection with said other rocking member.

8. In a shaker conveyer angle drive, a driving trough, a driven trough adapted to be arranged at an angle to said driving trough, one of said troughs being horizontally adjustable with respect to the other, a rocking member, a connection from one trough to said rocking member, for rocking said rocking member, a second rocking member rockable about an axis coaxial with the axis of rocking movement of said first rocking member, a drive connection from said second rocking member to said driven trough, and a friction drive connection from one rocking member to the other, said drive connection being releasable upon horizontal movement of said horizontally adjustable trough, to permit said rocking member associated with said adjustable trough to move to a position to maintain said rocking member in the same angular relation with respect to said adjustable trough in all positions of adjustment thereof, and including a friction band associated with one of said rocking members and having releasable engaging connection with said other rocking member, and an engaging connection between said adjustable trough and said friction band, for releasing said friction band upon adjustable movement of said adjustable trough.

9. In a shaker conveyer angle drive, a driving trough, a driven trough adapted to be arranged at an angle to said driving trough, one of said troughs being horizontally adjustable with respect to the other, a rocking member, a connection from one trough to said rocking member, for rocking said rocking member, a second rocking member rockable about an axis coaxial with the axis of rocking movement of said first rocking member, a drive connection from said second rocking member to said driven trough, and a rocking member to said driven trough, and a friction drive connection from one rocking member to the other, said drive connection being releasable upon horizontal movement of said horizontally adjustable trough, to permit said rocking member associated with said adjustable trough to move to a position to maintain said rocking member in the same angular relation with respect to said adjustable trough in all positions of adjustment thereof, and including a friction band associated with one of said rocking members and having releasable engaging connection with said other rocking member, and spaced apart engaging means movable with said adjustable trough, for releasing said friction band upon horizontal adjustable movement of said adjustable trough in one direction or another.

10. In a shaker conveyer angle drive, a driving trough, a driven trough adapted to be arranged at an angle to said driving trough, one of said troughs being horizontally adjustable with respect to the other, a rocking member, a connection from one trough to said rocking member, for rocking said rocking member, a second rocking member rockable about an axis coaxial with the axis of rocking movement of said first rocking member, a drive connection from said second rocking member to said driven trough, and a friction drive connection from one rocking member to the other, said drive connection being releasable upon horizontal movement of said horizontally adjustable trough to permit said rocking member associated with said adjustable trough to move to a position to maintain said rocking member in the same angular relation with respect to said adjustable trough in all positions of adjustment thereof and including a friction band associated with one of said rocking members, yieldable means for yieldably engaging said friction band with said other rocking member, and means movable with said adjustable trough and adapted to release said friction band against said yieldable means upon reciprocation of the conveyer and during alternate strokes of the conveyer.

11. In a shaker conveyer angle drive, a driving trough, a driven trough adapted to be arranged at an angle to said driving trough, one of said troughs being horizontally adjustable with respect to the other, a rocking member, a connection from one trough to said rocking member, for rocking said rocking member, a second rocking member rockable about an axis coaxial with the axis of rocking movement of said first rocking member, a drive connection from said second rocking member to said driven trough, and a friction drive connection from one rocking member to the other, said drive connection being releasable upon horizontal movement of said horizontally adjustable trough to permit said rocking member associated with said adjustable trough to move to a position to maintain said rocking member in the same angular relation with respect to said adjustable trough in all positions of adjustment thereof and including a friction band associated with one of said rocking members, yieldable means for yieldably engaging said friction band with said other rocking member, and means movable with said adjustable trough and adapted to release said friction band against said yieldable means upon reciprocation of the conveyer and during alternate strokes of the conveyer, including a pair of spaced engaging members adapted to engage said means for yieldably engaging said friction band with said rocking member, to release said friction band during the portions of alternate strokes of the conveyer to cause said friction band to move said second rocking member into a definite angular position with respect to said driven trough, each of said engaging members being spaced from their point of engagement with said releasable means a distance equal to half the stroke of the conveyer when said second rocking member is at the center of its stroke and is in the proper angular position with respect to said driven trough section.

12. In a shaker conveyer angle drive, a driving trough, a driven trough adapted to be arranged at an angle to said driving trough, one of said troughs being horizontally adjustable with respect to the other, a rocking member, a connection from one trough to said rocking member, for rocking said rocking member, a second rocking member rockable about an axis coaxial with the axis of rocking movement of said first rocking member, a drive connection from said second rocking member to said driven trough, and a friction drive connection from one rocking member to the other, said drive connection being releasable upon horizontal movement of said horizontally adjustable trough, to permit said rocking member associated with said adjustable trough to move to a position to maintain said rocking member in the same angular relation with respect to said adjustable trough in all positions of adjustment thereof and including a friction band associated with one of said rocking members, yieldable means for yieldably engaging said friction band with said other rocking member, and means movable with said adjustable trough and adapted to release said friction band against said yieldable means when said second rocking member is out of the proper position with respect to said driven trough to automatically center said second rocking member with respect to said driven trough including a pair of spaced stops having operative connection with said yieldable means, a pair of spaced stops associated with said movable trough and spaced on opposite sides of said first mentioned stops, one of said first mentioned stops being adapted to engage one of said second mentioned stops during alternate strokes of the conveyor, to release said friction band against said yieldable means, each of said second mentioned stop members being spaced from one of said first stops a distance equal to half the stroke of the conveyer, when said second rocking member is at the center of its stroke and is in the proper angular position with respect to said driven trough.

13. In a shaker conveyer angle drive, a driving trough, a driven trough adapted to be arranged at an angle to said driving trough, one of said troughs being adjustable with respect to the other about a vertical axis, and means for driving one trough from the other in all positions of adjustment of one trough with respect to the other including a rocking member, a connection from one trough to said rocking member, a second rocking member, rockable about an axis coaxial with the axis of rocking movement of said first rocking member, and a drive connection from one rocking member to the other, releasable upon adjustable movement of one trough with respect to the other, for driving one rocking member with respect to the other, but permitting relative movement of one rocking member with respect to the other, to permit said rocking members to be adjustably moved as said troughs are moved with respect to each other, to reduce angularity in the drive from said rocking members to their associated troughs including a friction band, an engaging connection between said friction band and one of said rocking members, and means movable with said adjustable trough, for releasing said friction band, to permit said other rocking member to move with said adjustable trough.

JOHN H. HOLSTEIN.